US010999637B2

(12) United States Patent
Kelley et al.

(10) Patent No.: US 10,999,637 B2
(45) Date of Patent: May 4, 2021

(54) VIDEO MEDIA ITEM SELECTIONS

(71) Applicant: Adobe Inc., San Jose, CA (US)

(72) Inventors: Yohko A. F. Kelley, Woodinville, WA (US); Mathieu Rene Badimon, New York, NY (US)

(73) Assignee: Adobe Inc., San Jose, CA (US)

( * ) Notice: Subject to any disclaimer, the term of this patent is extended or adjusted under 35 U.S.C. 154(b) by 188 days.

(21) Appl. No.: 14/016,040

(22) Filed: Aug. 30, 2013

(65) Prior Publication Data
US 2015/0067739 A1   Mar. 5, 2015

(51) Int. Cl.
*H04N 21/472* (2011.01)
*H04N 21/4788* (2011.01)
*H04N 21/478* (2011.01)
*H04N 21/4725* (2011.01)

(52) U.S. Cl.
CPC ... *H04N 21/47205* (2013.01); *H04N 21/4725* (2013.01); *H04N 21/4788* (2013.01); *H04N 21/47815* (2013.01)

(58) Field of Classification Search
CPC ............ H04N 21/40; H04N 21/47205; H04N 21/4781; H04N 21/4788; H04N 21/812; H04N 21/4331; H04N 21/435; H04N 21/235; H04N 21/47815; H04N 21/8586; H04N 21/8583; H04N 21/858; H04N 21/8545; H04N 21/622; H04N 21/472; H04N 21/4722; H04N 21/4725; H04N 21/478
See application file for complete search history.

(56) References Cited

U.S. PATENT DOCUMENTS

| | | | | |
|---|---|---|---|---|
| 7,870,592 | B2* | 1/2011 | Hudson | H04N 21/47 725/112 |
| 7,925,973 | B2* | 4/2011 | Allaire | H04N 21/25891 715/248 |
| 8,281,332 | B2* | 10/2012 | Rajaraman | G06Q 30/02 725/32 |
| 8,312,486 | B1* | 11/2012 | Briggs | H04N 21/8455 725/32 |
| 8,798,445 | B2* | 8/2014 | Marks | G06Q 30/02 386/299 |
| 8,813,132 | B2* | 8/2014 | Andrews, II | H04N 21/47815 725/60 |
| 2009/0064218 | A1* | 3/2009 | Yamagishi | H04N 21/4882 725/25 |

(Continued)

*Primary Examiner* — Alexander Gee
(74) *Attorney, Agent, or Firm* — FIG. 1 Patents (57) ABSTRACT

In embodiments of video media item selection, items that have been designated for association with video media are displayed while the video media is also displayed for viewing. An item grab application is implemented to receive a user input as an item selection of an item that is associated with the video media while being displayed for viewing. An item page for the selected item can be displayed, where the item page includes an identifier and image of the selected item, as well as a selectable link to the video media. The item grab application can also post the item selection to a social media site when the user shares the selected item. The item selection is posted without the video media that the selected item is associated with, and the video media is selectable for viewing from the item selection that is posted to the social media site.

17 Claims, 6 Drawing Sheets

(56) References Cited

U.S. PATENT DOCUMENTS

| | | | |
|---|---|---|---|
| 2011/0004517 A1* | 1/2011 | Soto | G06Q 30/0251 |
| | | | 705/14.51 |
| 2012/0084812 A1* | 4/2012 | Thompson | H04N 21/812 |
| | | | 725/34 |
| 2012/0114313 A1* | 5/2012 | Phillips | G11B 27/105 |
| | | | 386/298 |
| 2012/0167146 A1* | 6/2012 | Incorvia | H04N 21/4725 |
| | | | 725/60 |
| 2013/0117788 A1* | 5/2013 | Glasgow | H04N 21/4758 |
| | | | 725/60 |
| 2013/0283301 A1* | 10/2013 | Avedissian | H04N 21/812 |
| | | | 725/5 |
| 2014/0140680 A1* | 5/2014 | Jo | H04N 9/8715 |
| | | | 386/241 |
| 2014/0149884 A1* | 5/2014 | Flynn, III | H04L 51/046 |
| | | | 715/752 |
| 2014/0215529 A1* | 7/2014 | Good | H04N 21/2542 |
| | | | 725/60 |

* cited by examiner

VIDEO MEDIA ITEM SELECTIONS

BACKGROUND

Many types of devices today can be used to watch and share videos and video clips, such as with a mobile phone, tablet device, portable media device, and other electronic media devices. The accessibility and ease of use of the many types of devices makes it quite easy for anyone to watch and share video clips with friends and social network users, such as via the many different types of available social media applications. Although it is easy for a user to watch and share video clips, a user cannot separate an interesting moment or item out of a video and save and/or share it while still maintaining a link to the video.

For example, a user may share a video clip with a friend who has to watch the video to see something interesting that the user wanted to share, which appears sometime during playback of the video clip. In another example, a viewer may be watching a television program, movie, advertisement, or other form of video media, and see something interesting that the viewer wants more information about. Typically, the viewer can then search for a video clip, a product Web site, or other content via the Internet to find more information about a particular, interesting item. Additionally, the interesting item as-seen in a television program, movie, advertisement, or other form of video media can be difficult to share with friends and other social network users, and any additional information about the item that the viewer may locate is not connected to the original video media.

SUMMARY

This Summary introduces features and concepts of video media item selections, which is further described below in the Detailed Description and/or shown in the Figures. This Summary should not be considered to describe essential features of the claimed subject matter, nor used to determine or limit the scope of the claimed subject matter.

Video media item selections is described. In embodiments, a computing device can display items associated with video media that is also displayed for viewing, where the items have been designated for association with the video media by a content producer of the video media. Item tags of the items that are associated with the video media have properties that include at least a start time and a time duration to display an item concurrently while the video media is displayed for viewing. The video media can be displayed for viewing on the computing device concurrently with the items that are associated with the video media. Alternatively, the items that are associated with the video media are downloaded for display at the computing device concurrently with the video media being displayed on a television display device.

In embodiments, an item grab application is implemented to receive a user input as an item selection of an item that is associated with the video media while the video media is displayed for viewing. The item grab application can communicate the item selection to a data server that is associated with the content producer of the video media, and receive an item page that is displayed for the selected item. The item page for an item selection of a selected item can include at least an identifier of the selected item, an image of the selected item, and a selectable link to the video media that the item selection is associated with. The selectable link may be to the start of the video media that is associated with the selected item, or the selectable link is to a segment of the video media where the selected item occurs in the video media. The item page for an item selection of a selected item may also include additional selectable links to information and content of the selected item, such as information to purchase a product or a service corresponding to the selected item.

The item grab application is also implemented to post an item selection to a social media site when the user shares the item selection for the selected item. The item selection is posted without the video media that the selected item is associated with, and the video media is selectable for viewing from the posted item selection at the social media site. The item grab application can also receive back a notification that a social media user further selected the posted item selection at the social media site. The item grab application can also be implemented to communicate item selection information to a data server that is associated with the content producer of the video media, and the item selection information is accessible for advertising analytics.

BRIEF DESCRIPTION OF THE DRAWINGS

Embodiments of video media item selections are described with reference to the following Figures. The same numbers may be used throughout to reference like features and components that are shown in the Figures.

DETAILED DESCRIPTION

Embodiments of video media item selections are described, which enables users to discover video through tags their friends have chosen from a point in a video timeline of a video. A content producer can tag video media with relevant tags, and associate content to these tags. For example, video media may be a television program that is a talk show about dogs, and a particular talk show episode includes a show host discussing a guest author's new dog book. A content producer of the talk show can designate items that are associated with the video media, such as the show host, the show's guest author, the author's dog book, and other items related to dogs, as discussed on the talk show. A viewer can then, at any point during the talk show, "grab" an item out of the video media, such as the dog book so that the user does not have to then search for the book on another site that may sell the book.

The features of video media item selections direct people to find video that may be of interest to them in a different way. Typically, a user shares a video clip with a friend who has to watch the video to see what the user shared, and often the interesting item appears sometime during playback of the video. Now with video media item selections (also referred to herein as "item grabs"), the user can share the interesting item without the video that the item originates from. The friend can then consider the interesting item without having to sit and watch the video, but optionally, has the choice to select the video for viewing if the friend finds the shared item to be as interesting as the user who shared the item.

In embodiments, an item page for a selected item of an item selection can be displayed that shows available user options, such as to buy a product or service, or take other actions that are associated with the item selection. Additionally, an item selection is always tied back to the original video media from which the viewer selected or grabbed the item in the first place. An item selection can also be saved and/or shared via social media applications. When a viewer shares an item selection, his or her friends that come across the item selection on a social media site can select to watch the original video media that the item selection is associated with, thus allowing them to discover new videos that may be relevant or interesting to them.

Being able to "grab" items directly from video media that is being displayed for viewing offers a new user experience, and a new way to discover videos and other related media. This is also a benefit to television networks and producers of video content because the original video content is getting more viewership when later selected for viewing. This may also be implemented with targeted and/or time-shifted advertisement insertion when tracking analytics corresponding to item selections, posted and shared item selections, and video media replays initiated from the item selections.

While features and concepts of video media item selections can be implemented in any number of different devices, systems, networks, environments, and/or configurations, embodiments of video media item selections are described in the context of the following example devices, systems, and methods.

Figure 1:
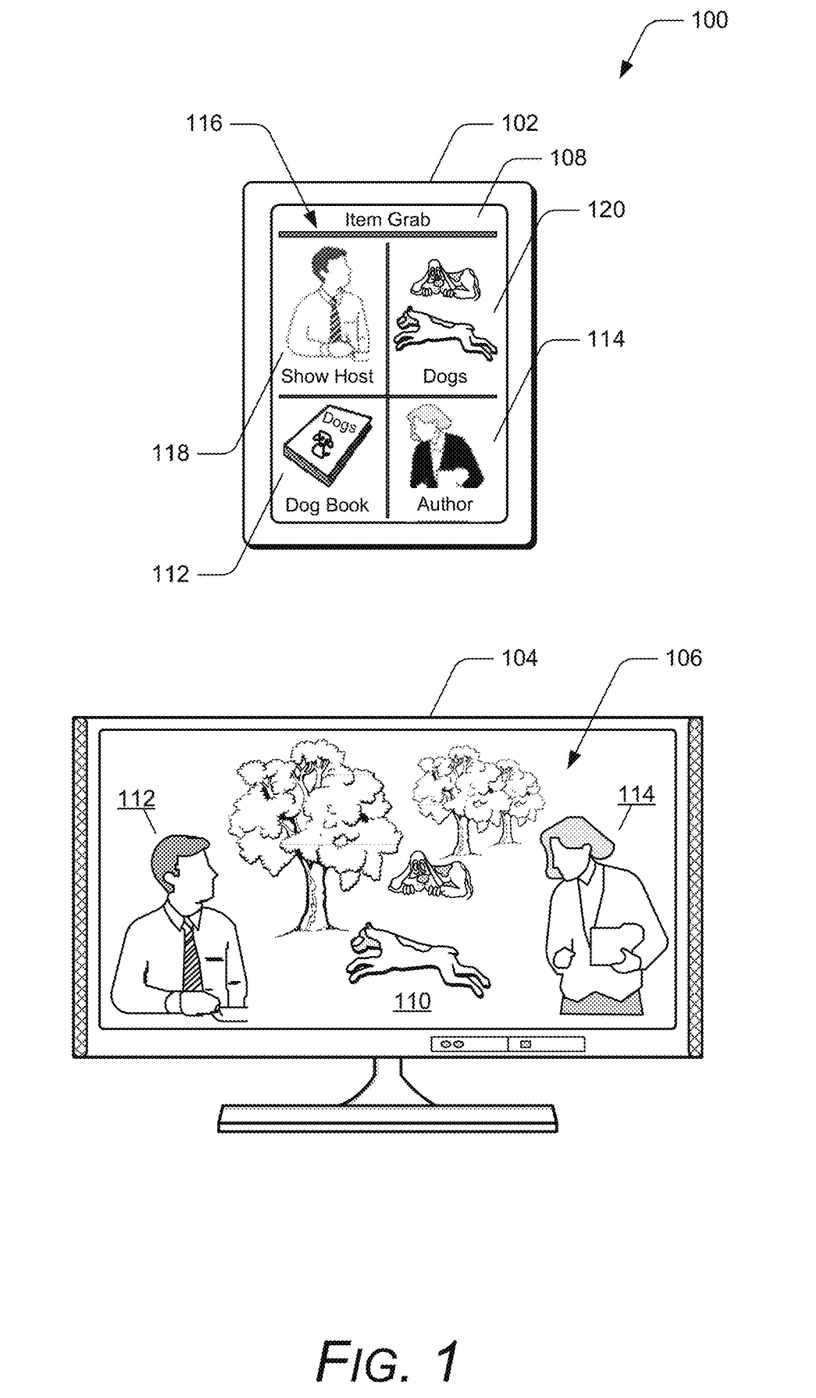
FIG. 1 illustrates an example of video media item selections in accordance with one or more embodiments.

FIG. 1 illustrates an example 100 of an implementation for embodiments of video media item selections. The example 100 includes a computing device 102 and a television display device 104, such as any type of display device that can receive and/or display video media 106. The video media may be any type of live broadcast, delayed, or recorded video, such as television programs, movies, advertisements, and on-demand video, as well as video clips and other forms of video that may be accessed via the Internet and displayed for viewing on a computer display device and/or a television display device.

The computing device 102 may be any one or combination of a wired or wireless device, such as a mobile phone, tablet, computing, communication, entertainment, gaming, media playback, and/or other type of device. Any of the devices can be implemented with various components, such as a processing system and memory, an integrated display device 108, and any number and combination of differing components as further described with reference to the example device shown in FIG. 6.

In this example, the video media 106 is a television program that is displayed for viewing on the television display device 104, and the example television program is a talk show that may be a live broadcast, a broadcast of the program previously aired, an on-demand recording of the program, or a client device recording of the program, such as when recorded with a digital video recorder (DVR) for later viewing. This talk show example is described and illustrated as relating to dogs 110, and includes a show host 112 and a guest author 114.

A content producer of video media, such as the talk show, can designate items that are associated with the video media. In this example, the content producer of the talk show has designated items 116 for association with the video media 106, and the items are displayed on the computing device 102 for user selection (also referred to herein as an "item grab"). The items that are displayed on the computing device for a user to select or grab include the show host 112, the show's guest author 114, the author's dog book 118, and an item related to the dogs 120 discussed on the talk show. The items 116 that are designated for association with video media may also include tagged items for any products, services, or other items, such as clothes, furniture, cars, etc. that appear on-screen and/or are mentioned while the video media is displayed for viewing.

A user of the computing device 102 can initiate an item selection of any of the items 116, such as the author's book, and then add a comment to the item selection, save the item selection in the user's grab bag for future reference, and/or post the item selection to social media sites to share the item selection with friends and other social media users. The social media sites may include Facebook, Twitter, Pinterest, and/or any other type of public or private social media that may be accessed by a user via a social media application interface. For example, a user watching the talk show may become interested in the topic of the show and the author's book. The user can open a "grab it" application (referred to herein as the item grab application) on the computing device 102, and the various items 116 that are associated with the talk show are displayed for user selection. Additionally, the items that are associated with the video media and displayed for user selection as item grabs are the items that are relevant to the current point in the talk show. For example, an item that correlates to the dog book may be displayed after the start of the program when the show host and the guest author introduce the dog book. Alternatively, if the subject of the dog book is the main topic of the talk show episode, then the item that correlates to the dog book may be displayed at the start and during the talk show.

Figure 2:
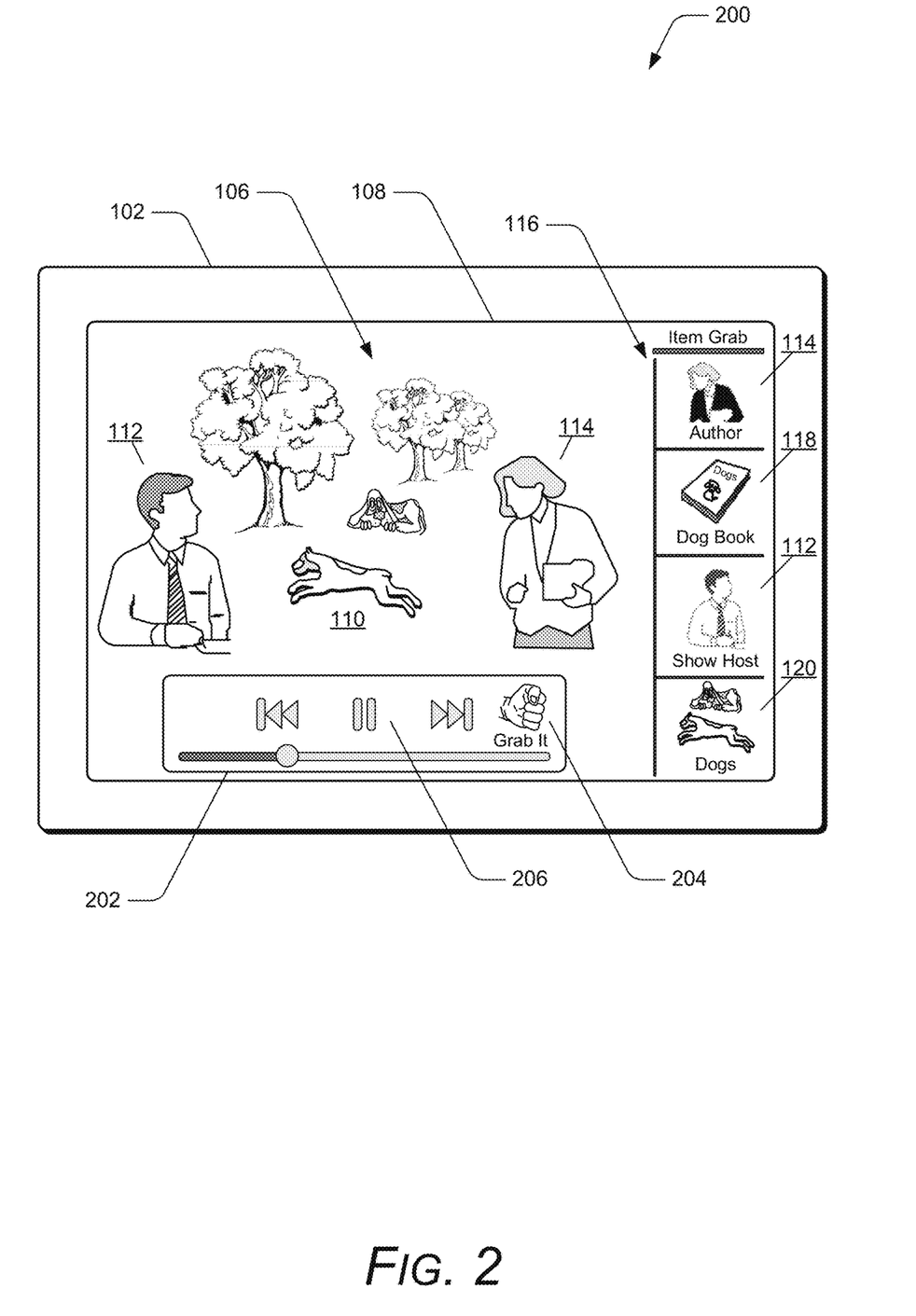
FIG. 2 illustrates another example of video media item selections in accordance with one or more embodiments.

FIG. 2 illustrates another example 200 of an implementation for embodiments of video media item selections. The example 100 includes the computing device 102 that displays the video media 106 for viewing, and the items 116 that are associated with the video media are displayed concurrently on the display device 108 while the video media is displayed for viewing. As described above, the video media in this example is a talk show and the items that are displayed on the computing device for a user to select or grab include the show host 112, the show's guest author 114, the author's dog book 118, and an item related to the dogs 120 discussed on the talk show.

As an alternative, or in addition, to the items 116 being displayed as shown for a user to select an item, an item grab interface 202 can be displayed over the video media 106 on the display device 108 of the computing device. A user can then initiate an item selection with a selectable control 204, such as with a touch contact on the display device 108 of the computing device 102. The item grab interface 202 may also include other video media controls 206, such as to pause, play, fast-forward, and rewind the video media that is being displayed for viewing.

Figure 3:
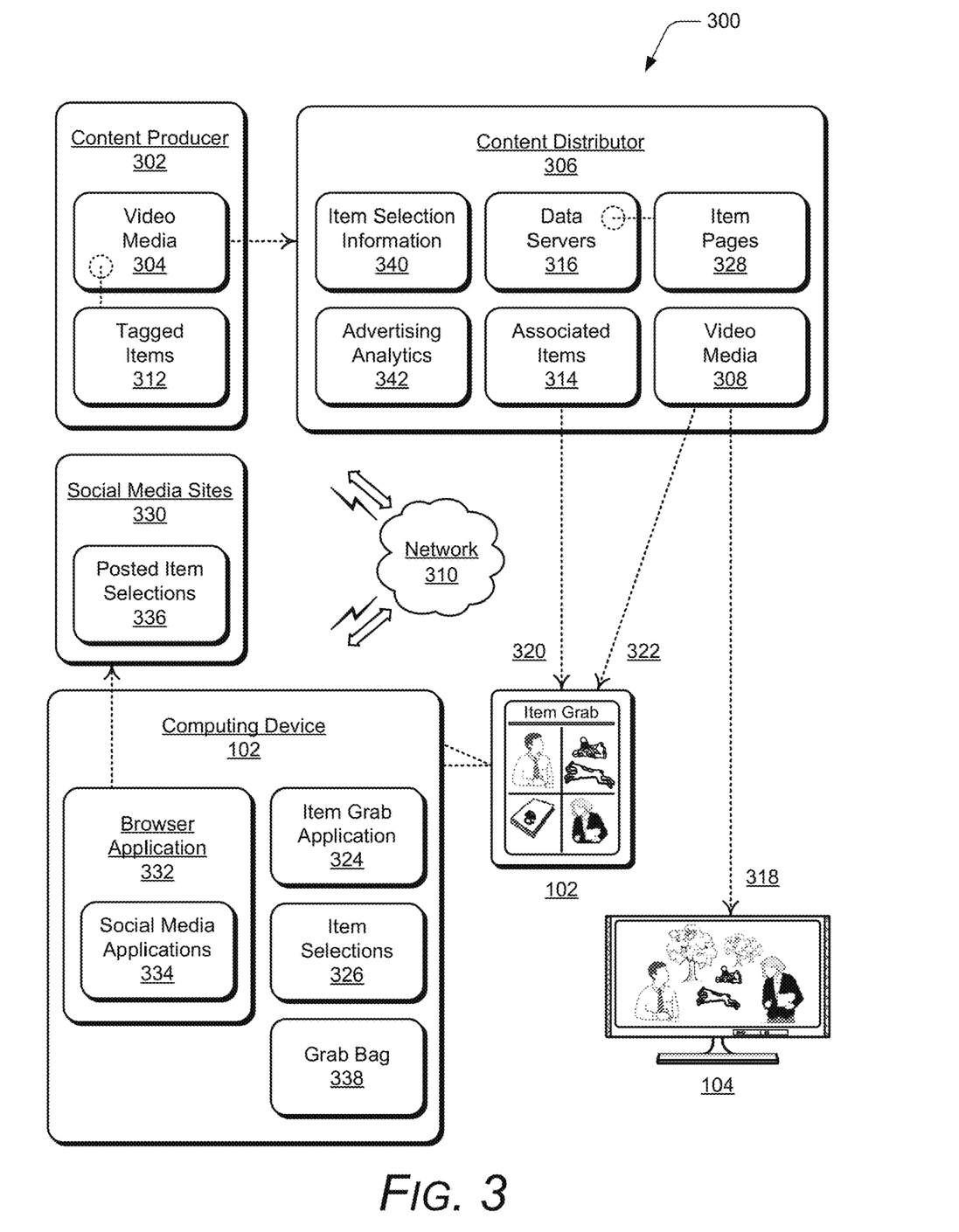
FIG. 3 illustrates an example system in which embodiments of video media item selections can be implemented.

FIG. 3 illustrates an example system 300 in which embodiments of video media item selections can be implemented. The example system 300 includes the computing device 102 and the television display device 104 as described with reference to FIGS. 1 and 2. The example system 300 also includes a content producer 302 of video media 304, as well as a content distributor 306 that receives the video media 304 from the content producer for storage and/or distribution as the video media 308. Although shown and described as separate entities, the content producer and the content distributor may be implemented as the same entity, or each as multiple entities, to produce and distribute video media to television and computing devices. Additionally, any devices and servers of the content producer and/or content distributor can be implemented with various components, such as a processing system and memory, as well as any number and combination of differing components as further described with reference to the example device shown in FIG. 6.

Any of the devices, data servers, and networked services described herein can communicate via a network 310, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In this example system 300, the content producer 302 produces, or otherwise generates, the video media 304 and designates tagged items 312 that are associated with the video media. The items 312 that are associated with the video media 304 have item tags with properties that can include a start time and a time duration to display an item while the video media is displayed for viewing. The start time to display an item 312 for a user to select or grab may coincide with a beginning of the video media that the item is associated with, or the start time to display the item may be after the video media has started displaying. Even live broadcast television content, such as breaking news or sporting events, can have at least some tagged items prepped before the television program is aired, such as based on likely topics that will be discussed, people that will likely appear on the program, and the like.

The content producer 302 communicates the video media 304 with the tagged items 312 to the content distributor 306, which is received and stored as the video media 308 and associated items 314. The content distributor 306 is implemented with data servers 316 to store or otherwise maintain the video media and the associated items received from various, different content producers. The content distributor 306 can then distribute the video media 308 to television display devices and/or computing devices that display the video media for viewing. The content distributor 306 can also communicate the associated items 314 to a computing device for concurrent display while the video media is being displayed for viewing.

As generally described with reference to the example shown in FIG. 1, the content distributor 306 distributes the video media 308 (e.g., to display as the talk show at 318) for viewing on the television display device 104. The content distributor 306 also communicates at 320 the associated items 314 (e.g., as the items 116 that are associated with the talk show) to the computing device 102, and the items are displayed on the computing device for user selection. Alternatively, as generally described with reference to the example shown in FIG. 2, the content distributor 306 distributes the video media 308 (e.g., to display as the talk show at 322) for viewing on the computing device 102 concurrently with the items 116 that are associated with the talk show. In implementations, the computing device 102 communicates directly with the content distributor 306 to receive the items 314 associated with the video media 308 that is currently being displayed on the television display device 104 for viewing. Alternatively or in addition, the computing device 102 may communicate directly with the television display device 104 as companion devices.

The computing device 102 includes an item grab application 324 that can be implemented as a software application (e.g., executable instructions) for item selections from video media, and the item grab application is stored on computer-readable storage media, such as any suitable memory device or electronic data storage. Additionally, the item grab application 324 can be executed with a processing system of the computing device 102 to implement embodiments of video media item selections. In embodiments, the item grab application 324 can receive a user input as an item selection 326 of an item 314 that is associated with the video media 308, while the video media is displayed for viewing. For example, as described with reference to FIGS. 1 and 2, a user can select or grab any of the tagged and associated items 116 of the talk show, such as the show host 112, the show's guest author 114, the author's dog book 118, and an item related to the dogs 120 discussed on the talk show. A user can initiate an item selection of the author's book, for example, and then add a comment to the item selection, save the item selection in a user's grab bag for future reference, and/or post the item selection to social media sites to share the item selection with friends and other social media users.

In embodiments, the item grab application 324 is implemented to communicate an item selection 326 to a data server that is associated with the content producer 302 of the video media, such as to a data server 316 at the content distributor 306. The item grab application can then receive an item page 328 from the data server 316 and initiate the item page being displayed for the selected item. An item page for an item that is selected with an item selection can be displayed on the display device 108 of the computing device 102, and the user can view all of the information and content related to the selected item.

An item page 328 can include an identifier of a selected item, an image of the selected item, and a selectable link back to the video media 308 that the item is associated with. An image of the selected item may be a thumbnail image or any other visual identifiers of the item selection from the associated video media. The selectable link to the video media of the item selection in an item page 328 may be a selectable link to a start of the video media, or a selectable link to a segment of the video media where the selected item occurs in the video media. In the talk show example, the show host and the guest author may not discuss the author's dog book until after the show has been on for several minutes. Accordingly, the selectable link to the video media of the talk show for an item selection of the dog book may be to the segment of the talk show where the show host and the guest author introduce the dog book. Alternatively, if the subject of the dog book is the main topic of the talk show episode, then the selectable link may be to the beginning of the video media of the talk show.

An item page 328 can also include additional information and/or selectable links to content related to the selected item, such as to information to purchase a product or a service corresponding to the selected item. For example, the item selection for the dog book may include a selectable link for the user to initiate a purchase of the dog book. The content on an item page 328 that is associated with an item selection can include links to any type of products, services, people profiles, business profiles, etc. An item page 328 can also include user comments from a user that shares an item selection 326, as well as selectable options and other user actions to link to the video media and/or to a segment of the video media, and to download, share, buy, comment, watch the video media, and any other actions that may be initiated by the user.

In embodiments, the item grab application 324 is also implemented to post an item selection 326 to a social media site 330 responsive to a user sharing the selected item, and the item selection 326 is posted to the social media site without the video media that the selected item is associated with. In implementations, the computing device 102 can include a browser application 332 through which social media applications 334 are accessed by a user to post the item selections 326 to the social media sites as the posted item selections 336. The video media 308 that is associated with the selected item is then selectable for viewing from a posted item selection 336 that is posted to a social media site. The social media sites 330 may include Facebook, Twitter, Pinterest, and/or any other type of public or private social media that may be accessed by a user via a user interface of a social media application 334.

For example, a social user can further grab or select a posted item selection 336 to see the information on the corresponding item page 328 for the posted item selection, such as a link to purchase a product or service related to the item selection, as well as the option to watch the video media and/or segment of the video media that the item selection is associated with. As a posted item selection 336 is further selected and perpetuated by social media users, the tie-back to the original video media and/or video segment is maintained along with other content and information correlating to an item selection and the selected item. In implementations, the item grab application 324 can also receive back a notification that a social media user further selected a posted item selection 336 at a social media site 330.

In embodiments, the item grab application 324 at the computing device 102 can receive multiple user inputs, each as an item selection 326 to select an additional item 314 associated with the video media 308 while the video media is displayed for viewing. The item selections 326 can then be maintained as a grab bag 338 that is associated with the user for subsequent review of the selected additional items. The item grab application 324 is also implemented to communicate item selection information 340 to a data server that is associated with the content producer 302 of the video media, such as to a data server 316 at the content distributor 306. The item selection information 340 can then be accessible for advertising analytics 342, such as when accessed by the content producer 302, the content distributor 306, and/or other entities that determine targeted advertising for a user of the computing device.

Example methods 400 and 500 are described with reference to respective FIGS. 4 and 5 in accordance with one or more embodiments of video media item selections. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 4:
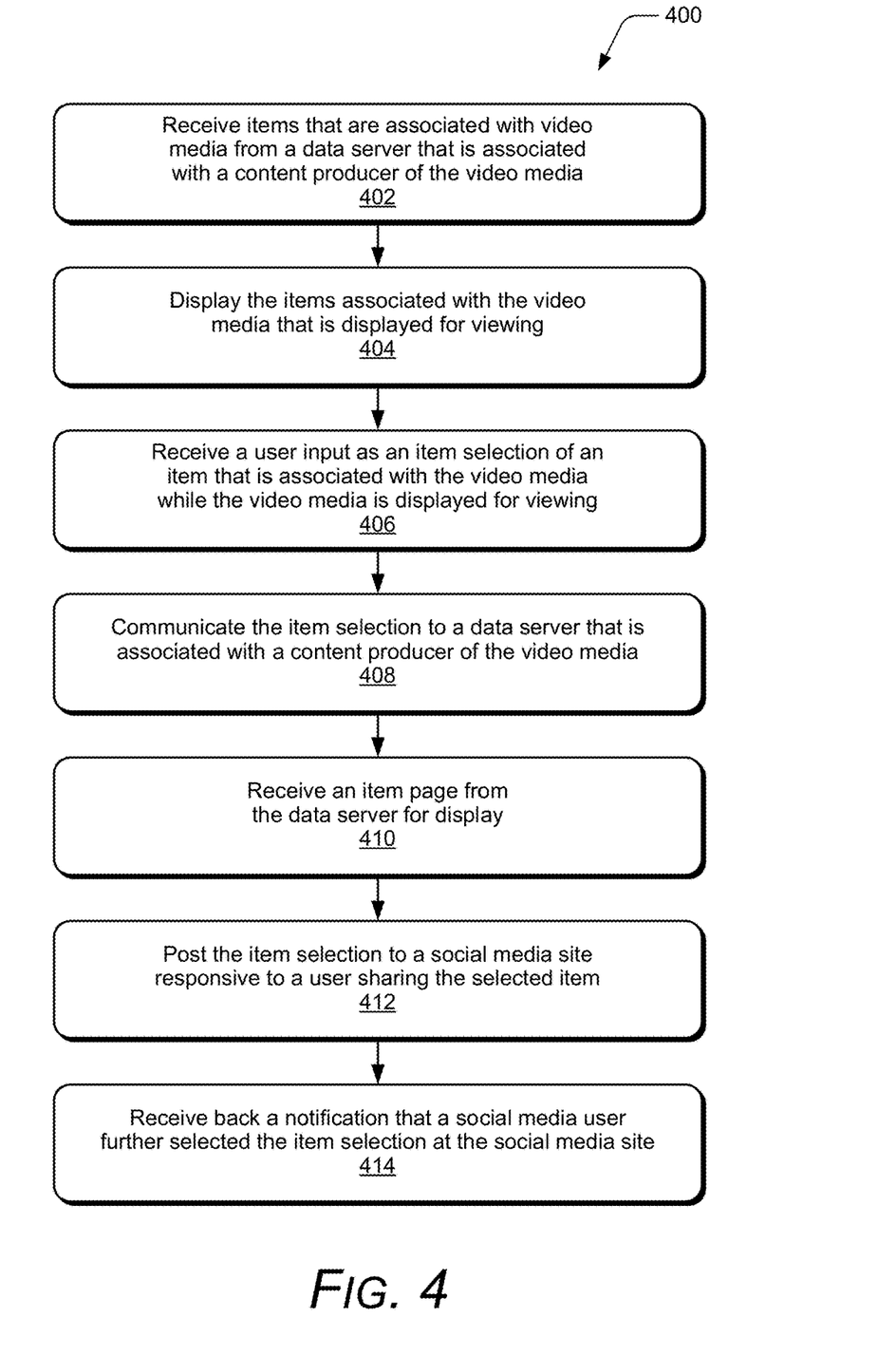
FIG. 4 illustrates example method(s) of video media item selections in accordance with one or more embodiments.

FIG. 4 illustrates example method(s) 400 of video media item selections, and is generally described with reference to an item grab application implemented by a computing device. The order in which the method is described is not intended to be construed as a limitation, and any number or combination of the method operations can be combined in any order to implement a method, or an alternate method.

At 402, items that are associated with video media are received from a data server that is associated with a content producer of the video media. For example, the item grab application 324 (FIG. 3) implemented by the computing device 102 receives the items 314 that are associated with the video media 308 from the content distributor 306. The computing device 102 communicates directly with the content distributor 306 to receive the items 314 associated with the video media 308 that is currently being displayed on the television display device 104 for viewing. The content producer 302 designates the items 314 that are associated with the video media 308, and the associated items have item tags with properties that can include a start time and a time duration to display an item while the video media is displayed for viewing.

At 404, displayed items are associated with the video media that is displayed for viewing. For example, the items 314 that are associated with the video media 308 are displayed on the computing device 102 while the video media is displayed for viewing. The video media 308 can be displayed for viewing concurrently with the items 314 that are associated with the video media on the display device 108 of the computing device. Alternatively, the items 314 can be displayed on the display device 108 of the computing device 102 concurrently with the video media 308 being displayed on the separate television display device 104.

At 406, a user input is received as an item selection of an item associated with the video media while the video media is displayed for viewing. For example, the item grab application 324 implemented by the computing device 102 receives a user input as an item selection 326 of an item 314 that is associated with the video media 308 while the video media is displayed for viewing. As described with reference to FIGS. 1 and 2, a user can select or grab any of the tagged and associated items 116 of the talk show, such as the show host 112, the show's guest author 114, the author's dog book 118, and an item related to the dogs 120 discussed on the talk show. A user can initiate an item selection of the author's book, for example, and then add a comment to the item selection, save the item selection in a user's grab bag for future reference, and/or post the item selection to social media sites to share the item selection with friends and other social media users.

At 408, the item selection is communicated to a data server that is associated with a content producer of the video media. For example, the item grab application 324 implemented by the computing device 102 communicates the item selection 326 to a data server that is associated with the content producer 302 of the video media, such as to a data server 316 at the content distributor 306.

At 410, an item page is received from the data server for display. For example, the item grab application 324 implemented by the computing device 102 receives an item page 328 from the data server 316 and initiates the item page being displayed for the selected item. An item page 328 for an item that is selected with an item selection can be displayed on the display device 108 of the computing device 102, and the user can view all of the information and content related to the selected item, such as an identifier of the selected item, an image of the selected item, and a selectable link to the video media.

At 412, the item selection is posted to a social media site responsive to a user sharing the selected item. For example, the item grab application 324 implemented by the computing device 102 posts an item selection 326 to a social media site 330 responsive to a user sharing the selected item, and the item selection 326 is posted to the social media site without the video media that the selected item is associated with. The video media 308 that is associated with the selected item is then selectable for viewing from a posted item selection 336 that is posted to the social media site, and a social user can further grab or select a posted item selection 336 to see the information on the corresponding item page 328 for the posted item selection. As a posted item selection 336 is further selected and perpetuated by social media users, the tie-back to the original video media and/or video segment is maintained along with other content and information correlating to an item selection and the selected item.

At 414, a notification is received that a social media user further selected the item selection at the social media site. For example, the item grab application 324 implemented by the computing device 102 receives back a notification that a social media user further selected a posted item selection 336 at a social media site 330.

Figure 5:
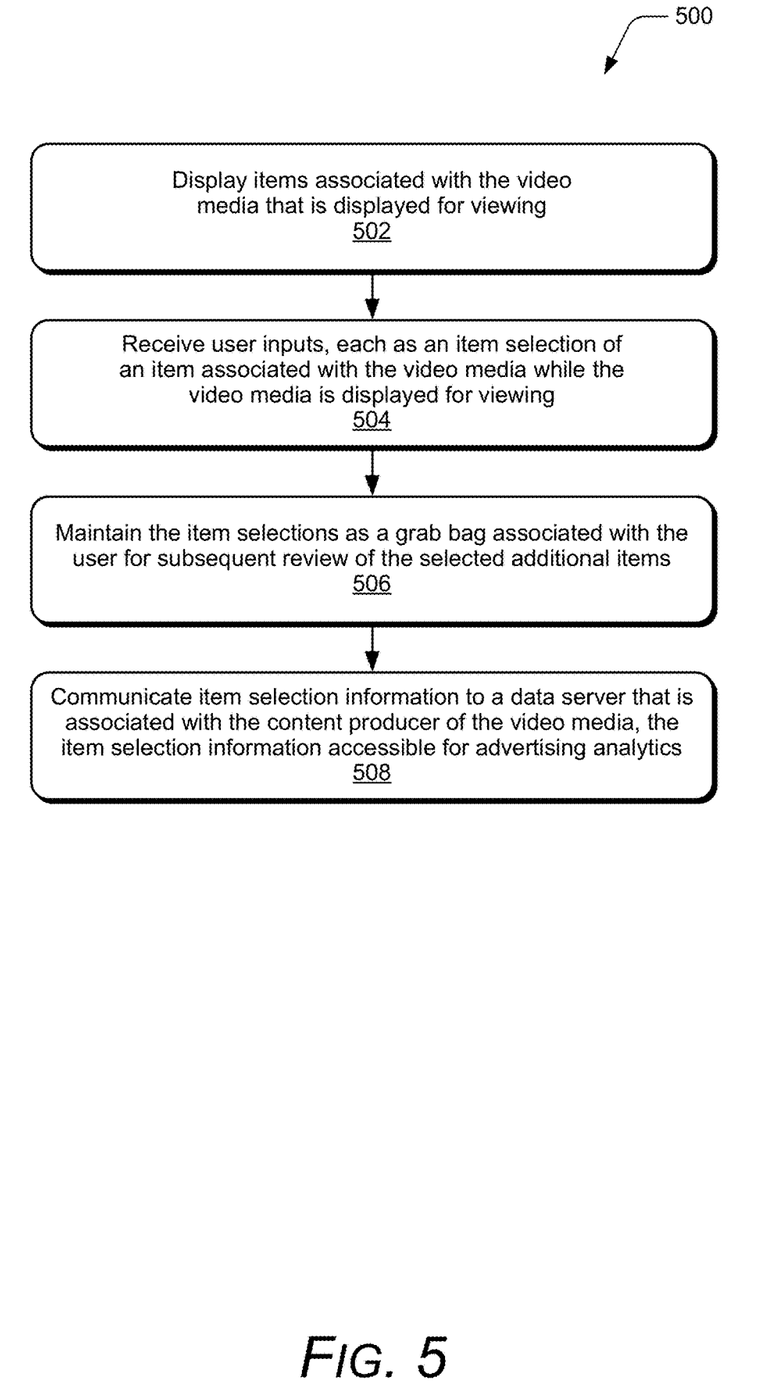
FIG. 5 illustrates example method(s) of video media item selections in accordance with one or more embodiments.

FIG. 5 illustrates example method(s) 500 of video media item selections, and is generally described with reference to an item grab application implemented by a computing device. The order in which the method is described is not intended to be construed as a limitation, and any number or combination of the method operations can be combined in any order to implement a method, or an alternate method.

At 502, displayed items are associated with the video media that is displayed for viewing. For example, the items 314 that are associated with the video media 308 are displayed on the computing device 102 while the video media is also displayed for viewing on the computing device, or displayed for viewing on the separate television display device 104.

At 504, user inputs are received, each as an item selection of an item associated with the video media while the video media is displayed for viewing. For example, the item grab application 324 implemented by the computing device 102 receives multiple user inputs, each as an item selection 326 to select an additional item 314 associated with the video media 308 while the video media is displayed for viewing.

At 506, the item selections are maintained as a grab bag associated with the user for subsequent review of the selected additional items. For example, the item grab application 324 implemented by the computing device 102 maintains the item selections 326 (such as stored in a memory component of the computing device) as the grab bag 338 that is associated with the user for subsequent review of the selected additional items.

At 508, item selection information is communicated to a data server that is associated with the content producer of the video media, the item selection information accessible for advertising analytics. For example, the item grab application 324 implemented by the computing device 102 communicates the item selection information 340 to a data server that is associated with the content producer 302 of the video media, such as to a data server 316 at the content distributor 306. The item selection information 340 can then be accessible for advertising analytics 342, such as when accessed by the content producer 302, the content distributor 306, and/or other entities that determine targeted advertising for a user of the computing device.

Figure 6:
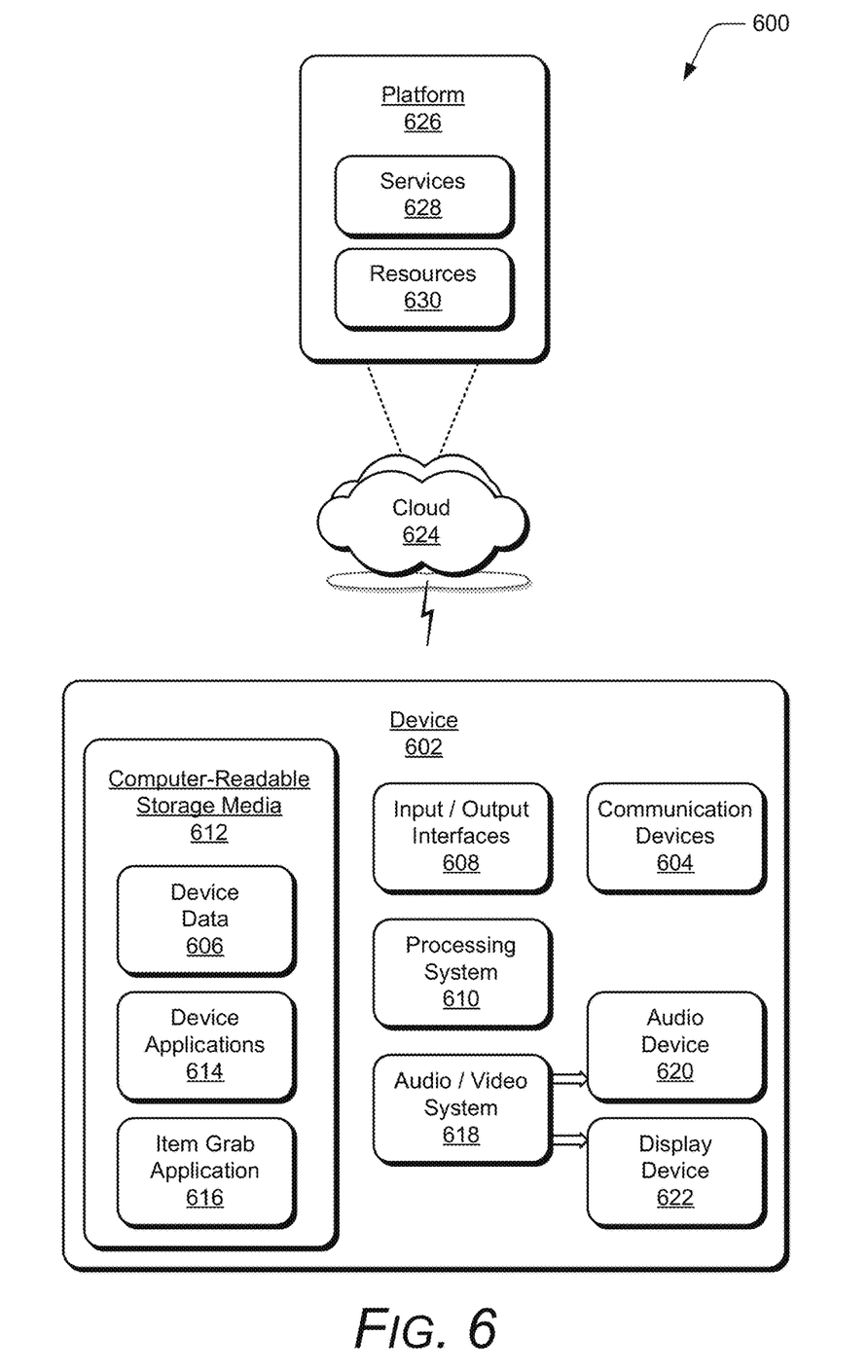
FIG. 6 illustrates an example system with an example device that can implement embodiments of video media item selections.

FIG. 6 illustrates an example system 600 that includes an example device 602, which can implement embodiments of video media item selections. The example device 602 can be implemented as any of the devices and/or server devices described with reference to the previous FIGS. 1-5, such as any type of client device, mobile phone, tablet, computing, communication, entertainment, gaming, media playback, and/or other type of device. For example, the computing device 102 and the television display device 104, as well as any devices and servers of the content producer 302 and the content distributor 306 shown in FIGS. 1-3 may be implemented as the example device 602.

The device 602 includes communication devices 604 that enable wired and/or wireless communication of device data 606, such as video media and associated items, item selections, posted item selections, item selection information, and item pages for selected items of item selections. The device data can include any type of audio, video, and/or image data, as well as item selection information and data. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device that may be integrated with device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 612, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 612 provides storage of the device data 606 and various device applications 614, such as an operating system that is maintained as a software application with the computer-readable storage media and executed by the processing system 610. In this example, the device applications also include an item grab application 616 that implements embodiments of video media item selections, such as when the example device 602 is implemented as the computing device 102 shown in FIGS. 1-3. Examples of the item grab application 616 include the item grab application 324 implemented by the computing device 102, as described with reference to FIG. 3.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for video media item selections may be implemented in a distributed system, such as over a "cloud" 624 in a platform 626. The cloud 624 includes and/or is representative of the platform 626 for services 628 and/or resources 630. For example, the services 628 may include the content producer 302 and/or the content distributor 306 as described with reference to FIG. 3. Additionally, the resources 630 may include the item grab application that is implemented by the computing device as described with reference to FIGS. 1-3.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of video media item selections have been described in language specific to features and/or methods, the appended claims are not necessarily limited to the specific features or methods described. Rather, the specific features and methods are disclosed as example implementations of video media item selections.

The invention claimed is:

1. A method, comprising:
    receiving items associated with video media, each of the items being identified with an item tag that indicates when a respective item is relevant to a portion of the video media;
    initiating displaying the video media and displaying the items associated with the video media for viewing concurrently on a display device, the items being displayed for selection separately from an appearance of the items in the display of the video media, and each item being displayed during the relevant portion of the video media as designated by the associated item tag, at least one of the items associated with an additional item tag that indicates when to display the at least one item on the display device as a selectable item relevant to the portion of the video media, the selectable item being mentioned in the video media but not appearing in the display of the video media;
    receiving a user input as an item selection of one of the separately displayed items while the video media is displayed for viewing, said receiving the user input during the relevant portion of the video media in which the selected item is being displayed;
    initiating an item page being displayed for the selected item, the item page including a display of at least an identifier of the selected item, an image of the selected item, and a selectable link to the video media;
    sharing the item selection via one or more social media applications, the video media associated with the selected item being selectable for viewing from the item selection posted to a social media site;
    receiving a notification indicative of a social media user having further selected the item selection at the social media site; and
    communicating the notification to a data server associated with a content producer of the video media.

2. The method as recited in claim 1, further comprising posting the item selection from the video media to a social media site responsive to receiving a share input of the selected item shared by the user, said posting the item selection from the video media to the social media site posts the item selection without the video media associated with the selected item.

3. The method as recited in claim 1, wherein the video media is a live television broadcast displayed on a television device, and wherein the items associated with the video media are displayed separately on the display device.

4. The method as recited in claim 1, wherein the video media is displayed on the display device of a computing device, the item associated with the video media is downloaded for display on the display device of the computing device concurrently with the video media, and the user input is received via an interface displayed over the video media on the display device of the computing device.

5. The method as recited in claim 1, further comprising:
    receiving the item page from the data server to said initiate the item page being displayed for the selected item.

6. The method as recited in claim 1, further comprising:
    receiving additional user inputs, each as another item selection of additional items associated with the video media while the video media is displayed for viewing; and
    maintaining the item selections as a grab bag associated with the user for subsequent review of the selected additional items.

7. The method as recited in claim 1, wherein the selectable link to the video media of the item selection comprises:
    a first selectable link to a start of the video media associated with the selected item; and
    a second selectable link to a segment of the video media where the selected item occurs in the video media.

8. The method as recited in claim 1, wherein the item selection provides for a user comment on the item selection.

9. The method as recited in claim 1, further comprising communicating item selection information to the data server associated with the content producer of the video media, the item selection information accessible for advertising analytics.

10. A method, comprising:
    receiving items associated with video media from a data server associated with a content producer of the video media;

displaying the items associated with the video media also displayed for viewing, the items displayed for viewing on a display device of a computing device and the video media displayed on a television display, each of the items being identified with an item tag that indicates when a respective item is relevant to a portion of the video media, at least one of the items associated with an additional item tag that indicates when to display the at least one item on the display device of the computing device as a selectable item relevant to the portion of the video media, the selectable item being mentioned in the video media but not appearing in the display of the video media on the television display;

receiving, at the computing device, a user input as an item selection to select one of the items associated with the video media while the video media is displayed for viewing on the television display, said receiving the user input at the computing device during the relevant portion of the video media in which the selected one of the items is being displayed;

communicating, from the computing device, the item selection to the data server associated with the content producer of the video media;

receiving, at the computing device, an item page from the data server for display, the item page including at least an identifier of the selected item, an image of the selected item, and a selectable link to the video media;

posting the item selection to a social media site responsive to receiving a share input of the selected item shared by a user, the item selection posted without the video media associated with the selected item, and the video media being selectable for viewing from the item selection posted to the social media site;

receiving a notification indicative of a social media user having further selected the item selection at the social media site; and communicating the notification to the data server associated with the content producer of the video media.

11. The method as recited in claim 10, wherein the item selection provides for a user comment on the item selection.

12. The method as recited in claim 11, wherein the selectable link to the video media of the item selection comprises:
a first selectable link to a start of the video media associated with the selected item; and
a second selectable link to a segment of the video media where the selected item occurs in the video media.

13. The method as recited in claim 10, wherein item tags of the items associated with the video media have properties that include at least a start time and a time duration to display an item while the video media is displayed for viewing.

14. A computer-readable storage memory device comprising an item grab application stored as executable instructions and, responsive to execution of the instructions by a processor of a computing device, the computing device performs operations comprising to:
display video media and display items associated with the video media for viewing concurrently on a display device, wherein the items are displayed for selection separately from an appearance of the items in the display of the video media, each of the items being identified with an item tag that indicates when a respective item is relevant to a portion of the video media, at least one of the items associated with an additional item tag that indicates when to display the at least one item on the display device as a selectable item relevant to the portion of the video media, the selectable item being mentioned in the video media but not appearing in the display of the video media;

receive a user input as an item selection of one of the separately displayed items associated with the video media while the video media is displayed for viewing, said receiving the user input at the computing device during the relevant portion of the video media in which the selected one of the items is being displayed;

initiate an item page for the selected item being displayed, the item page including a display of at least an identifier of the selected item, an image of the selected item, and a selectable link to the video media;

post the item selection to a social media site responsive to receiving a share input of the selected item shared by a user, the item selection posted without the video media associated with the selected item, and the video media being selectable for viewing from the item selection posted to the social media site;

receive a notification indicative of a social media user having further selected the item selection at the social media site; and communicate the notification to a data server associated with a content producer of the video media.

15. The computer-readable storage memory device as recited in claim 14, wherein the computing device performs the operations further comprising to communicate item selection information to the data server associated with the content producer of the video media, the item selection information accessible for advertising analytics.

16. The computer-readable storage memory device as recited in claim 14, wherein the computing device performs the operations of the item grab application further comprising to:
receive the items associated with the video media from the data server associated with the content producer of the video media; and one of:
initiate displaying the video media and displaying the items associated with the video media for viewing concurrently on the display device of the computing device, wherein the items are displayed for selection separately from an appearance of the items in the display of the video media; or
initiate displaying the items on the display device of the computing device concurrently with the video media displayed on a television display.

17. The method as recited in claim 10, wherein said communicating the item selection to the data server where item selection information is accessible for advertising analytics.

* * * * *